(12) United States Patent
Trethewey

(10) Patent No.: US 6,259,488 B1
(45) Date of Patent: Jul. 10, 2001

(54) CONCEALING TEMPORAL SHIFT WHEN USING A DIGITAL VIDEO EFFECT SYSTEM WITH A VIDEO SWITCHER

(75) Inventor: Paul M. Trethewey, Nevada City, CA (US)

(73) Assignee: Grass Valley (US) Inc., Nevada City (CA)

( * ) Notice: Subject to any disclaimer, the term of this patent is extended or adjusted under 35 U.S.C. 154(b) by 0 days.

(21) Appl. No.: 09/360,804

(22) Filed: Jul. 22, 1999

(51) Int. Cl.[7] .............................. H04N 9/74; H04N 5/268
(52) U.S. Cl. ..................... 348/578; 348/591; 348/598; 348/705
(58) Field of Search .................................. 348/578, 584, 348/585, 587, 590, 591, 592, 593, 594, 595, 598, 599, 705, 706; H04N 9/74, 9/75, 9/76, 5/268

(56) References Cited

U.S. PATENT DOCUMENTS 4,947,256 * 8/1990 Wood ................................. 348/578

* cited by examiner

Primary Examiner—Sherrie Hsia
(74) Attorney, Agent, or Firm—Kenyon & Kenyon

(57) ABSTRACT

A method of concealing temporal shifts when a digital video effects system is used with a video switcher adds a mixer to the digital video effects system to mix the input to and output from the digital video effects system if the image to be transformed is on-screen at the beginning of the effect. An input video signal from a keyer in the video switcher is switched by an effects send/return matrix to the inputs of the digital video effects system and the mixer, and the output from the mixer is returned to the effects send/return matrix for input to the mix/effects stage of the video switcher. When the digital video effects system is bypassed, a delay circuit is used in the bypass path of the effects send/return matrix, the delay time equaling the processing time of the mixer.

5 Claims, 1 Drawing Sheet

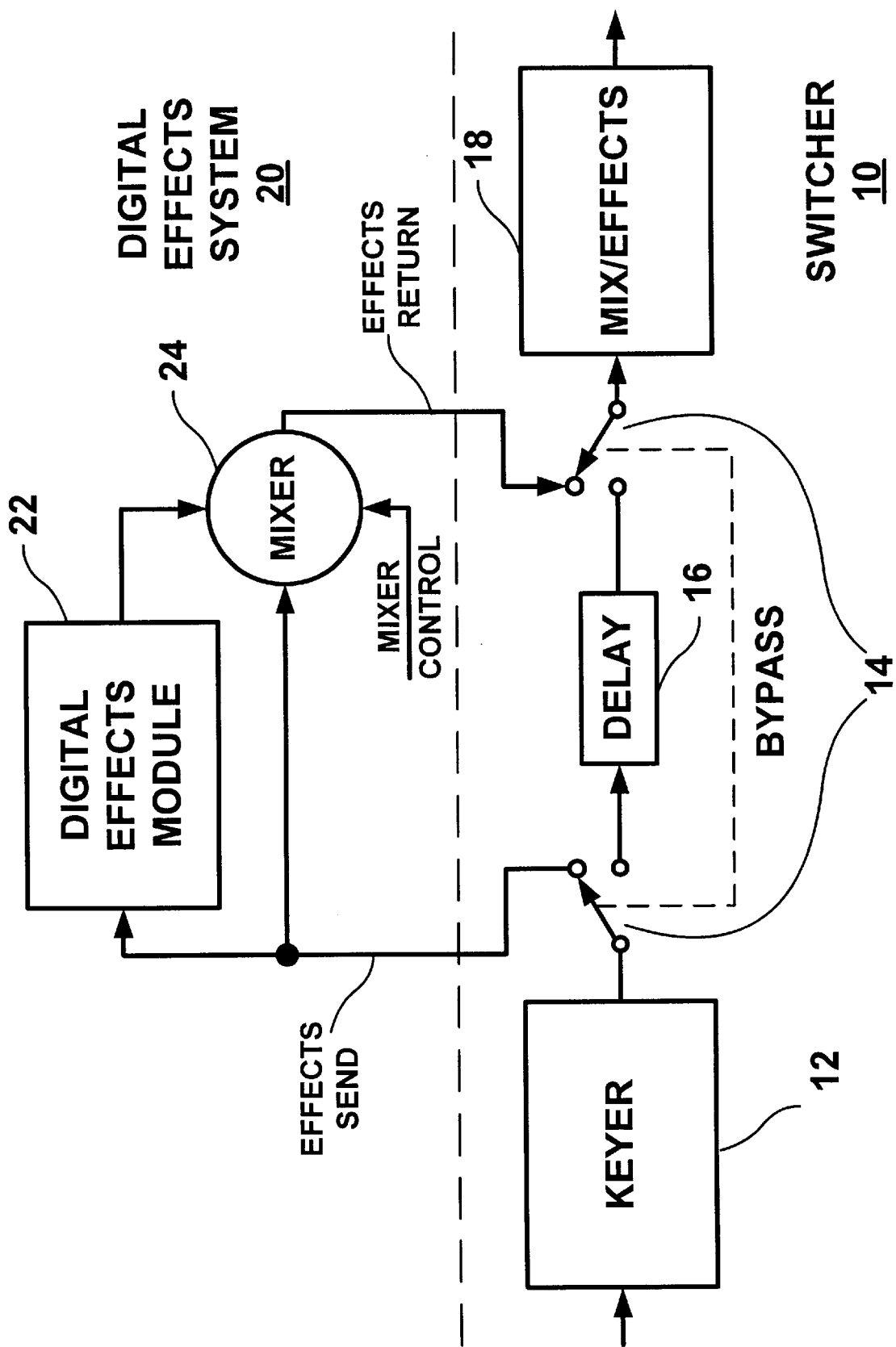

CONCEALING TEMPORAL SHIFT WHEN USING A DIGITAL VIDEO EFFECT SYSTEM WITH A VIDEO SWITCHER

BACKGROUND OF THE INVENTION

The present invention relates to video signal processing, and more particularly to a method of concealing temporal shift when using a digital effects system and a video switcher.

Television production switcher-based effects, such as mixes, wipes and keys where the pixels maintain their positions within the video raster, have a processing time to accomplish these effects that is typically shorter than two video scan lines. For transform effects, such as slides and pushes, pixels are moved to different locations in the raster and these effects are performed by a digital effects system. Digital effects systems have a latency—they delay the picture by a video frame or longer. This is necessary because pixels near the bottom of the picture are scanned after those nearer the top, and no pixel may be advanced up the raster before it is scanned into the system. Therefore in digital effects systems the picture is stored in a video frame memory and then read out from that memory using a different order of memory addresses, but necessarily delayed by at least one frame.

A frame memory is not necessary for performing video switcher effects and historically it has been omitted from the switcher's signal path because of its expense and complexity. In systems having both a video switcher and a digital video effects system, the digital video effects system is usually switched in and out of the switcher's processing path as an allocatable resource because of its expense and the desire to insert at many possible points along the path. When the digital video effects system is switched in, it adds its latency delay. At the moment of the switch there is a temporal "hop" in the resultant picture. The extent to which the temporal hop becomes noticeable and undesirable depends upon the picture content and the conditions when the switch is made.

Human perception is such that the extra delay through the digital video effects system is undetectable. However a change in the delay is quite noticeable if there is motion in the picture to provide a frame of reference. With video having moving objects a temporal hop becomes an easily seen spatial hop. Some things may be done to mask the temporal hop. If the scenes before and after the switch are the same and static, no spatial hop occurs and the switch is invisible. The temporal hop also may be masked in effects where the transformed image slides over the previous background image and the system cuts immediately to the non-transformed equivalent of the new image. In this case the spatial hop is masked by the transform's motion. A third way to smooth over the temporal hop is to do a video mix between the undelayed signal and its frame delayed counterpart. By doing so an abrupt movement is blurred and somewhat hidden.

Switcher operators may perform a mix as described above to mitigate the temporal hop. However to do so on an existing switcher required advance planning and a multi-step operation of mixing, performing the transform and then possibly mixing a second time to release the digital video effects system. These steps are at odds with the quick pace of a live video operation. Operators prefer to select a new scene and make the transition in one simple motion.

What is desired is a "hop hider" that automatically conceals the temporal shift when using a digital video effects system with a video switcher.

BRIEF SUMMARY OF THE INVENTION

Accordingly the present invention provides a hop hider for concealing temporal shifts when using a digital video effects system with a video switcher. A mixer is added to the output of the digital video effects system for mixing the video signal sent by the switcher to the digital video effects system with the video signal sent by the digital video effects system to the video switcher. The video signal is routed to the digital video effects system by a switcher effects send/return matrix, which also receives the output from the digital video effects system. In a bypass configuration a delay circuit is provided in the video switcher to match the delay caused by the mixer so that when the digital video effects system and its hop hider mixer are switched in, there is no perceptible change in the picture.

The objects, advantages and other novel features of the present invention are apparent from the following detailed description when read in conjunction with the appended claims and attached drawing.

BRIEF DESCRIPTION OF THE SEVERAL VIEWS OF THE DRAWING

The FIGURE is a block diagram view of a digital video effects system with a video switcher having a hop hider for concealing temporal shifts according to the present invention.

DETAILED DESCRIPTION OF THE INVENTION

Referring now to the FIGURE a video signal from a keyer 12 in a video switcher 10 is input to an effects send/return matrix 14. A delay circuit 16 is provided in a bypass path of the effects send/return matrix 14. The output from the effects send/return matrix 14 is input to a mix/effects circuit 18 that provides the final video signal output. Coupled to the input of the effects send/return matrix 14 is a digital effects module 22 in a digital video effects system 20. The input to and output from the digital effects module 22 are input to a mixer 24 where the two signals are mixed according to a mix control signal. The output from the mixer 24 is coupled to the output of the effects send/return matrix 14.

In operation an operator in preparing for an effect selects "EFFECTS TRANSITION" as the mode for changing to a new picture, similar to selecting "MIX" or "WIPE" on existing switcher control panels. If the selected digital effect is such that a hop-hiding mix is called for, the mix is done automatically by the switcher. The criterion for mixing is: if the image to be transformed is on-screen at the beginning of the effect, the mix is done when the "EFFECTS TRANSITION" button is activated. At the conclusion of the transform effect, the same criterion is applied after the Program and Preset buses swap. If the "EFFECTS TRANSITION" button is deactivated and the transformed image is on-screen, then a mix is done from the delayed to the undelayed picture.

The video signals being mixed by the mixer 24 are nearly identical in appearance, but displaced from each other temporally by an integral number of video fields, i.e., the delay through the digital effects module 22. The switcher's keyer 12 feeds the digital effects module 22 through the effects send/return matrix 14. When the digital effects module 22 is not being used by the keyer 12, then the signal path to and from the digital effects module is bypassed by the switches in the effects send/return matrix 14. The delay through the bypass represented by the delay circuit 16 is the same as that through the mixer 24 so there is no perceptible change in the picture when the digital video effects system 20 with the mixer are switched into the signal path of the video switcher 10.

The preferred embodiment shows the hop-hiding mixer 24 installed in the digital video effects system 20 to minimize mixer expense, as there are typically fewer digital effects system channels than keyer 12 send and return points in a video switcher 10. As an alternative the hop-hiding mixer 24 may be installed in the effects send/return matrix 14, allowing the video switcher 10 to interact more easily with existing digital video effects systems that do not already have the mixer installed. As a further alternative the digital effects module 22 may be integral with the video switcher 10, i.e., it need not be a separate module.

Thus the present invention provides temporal shift concealment when a digital video effects system is used with a video switcher by inserting a mixer in the effects send/return signal path for mixing the input to and output from the digital video effects system.

What is claimed is:

1. An apparatus for concealing temporal shifts when a digital video effects system is used with a video switcher comprising:

a mixer coupled to mix the input to and output from the digital video effects system when an effects send/return path is used by the video switcher; and a delay circuit coupled to bypass the effects send/return path when the digital video effects system is not used with the video switcher.

2. An improved apparatus of the type having a video switcher with an effects send/return matrix for interacting with a digital video effects system wherein the improvement comprises means for mixing a video signal for input to the digital video effects system from the video switcher via the effects send/return matrix with an output signal from the digital video effects system for return to the video switcher via the effects send/return matrix.

3. The apparatus as recited in claim 2 further comprising means for delaying the video signal when the digital video effects system is bypassed by the effects send/return matrix by an amount equal to the processing time of the mixing means.

4. A method of concealing temporal shifts when a digital video effects device is used with a video switcher comprising the steps of:

selectively routing a video signal from the video switcher to the digital video effects device and to a mixer;

mixing in the mixer the video signal with a transformed video signal from the digital video effects device to produce a processed video signal; and returning the processed video signal to the video switcher.

5. The method as recited in claim 4 further comprising the step of delaying the video signal when the digital video effects device is bypassed by an amount equal to the processing time of the mixing step.

* * * * *